(12) United States Patent
Kaye et al.

(10) Patent No.: US 9,660,294 B2
(45) Date of Patent: May 23, 2017

(54) ELECTROLYTE MATERIALS FOR BATTERIES AND METHODS FOR USE

(75) Inventors: Steven Kaye, San Diego, CA (US); Cory O'Neill, San Diego, CA (US); Wei Tong, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 884 days.

(21) Appl. No.: 13/612,798

(22) Filed: Sep. 12, 2012

(65) Prior Publication Data

US 2013/0065115 A1 Mar. 14, 2013

Related U.S. Application Data

(60) Provisional application No. 61/533,906, filed on Sep. 13, 2011.

(51) Int. Cl.
| | |
|---|---|
| H01M 10/056 | (2010.01) |
| H01M 4/36 | (2006.01) |
| H01M 10/052 | (2010.01) |
| H01M 10/0567 | (2010.01) |
| H01M 4/583 | (2010.01) |
| H01M 10/0566 | (2010.01) |
| H01M 10/0568 | (2010.01) |

(52) U.S. Cl.
CPC ........... H01M 10/056 (2013.01); H01M 4/36 (2013.01); H01M 10/052 (2013.01); H01M 10/0567 (2013.01); H01M 4/583 (2013.01); H01M 10/0566 (2013.01); H01M 10/0568 (2013.01)

(58) Field of Classification Search
None
See application file for complete search history.

(56) References Cited

U.S. PATENT DOCUMENTS

| | | | |
|---|---|---|---|
| 6,551,747 B1 * | 4/2003 | Gan | H01M 2/26 429/231.2 |
| 2002/0192564 A1 * | 12/2002 | Ota | H01M 4/0404 429/324 |
| 2003/0190530 A1 * | 10/2003 | Yang et al. | 429/326 |
| 2004/0146786 A1 * | 7/2004 | Sato | H01G 9/038 429/326 |
| 2005/0118512 A1 * | 6/2005 | Onuki et al. | 429/326 |
| 2005/0123831 A1 | 6/2005 | Michot et al. | |
| 2005/0282898 A1 * | 12/2005 | Buchwald et al. | 514/561 |
| 2006/0035137 A1 | 2/2006 | Maruo et al. | |
| 2006/0210883 A1 * | 9/2006 | Chen et al. | 429/326 |
| 2007/0202416 A1 * | 8/2007 | Chen et al. | 429/326 |
| 2007/0218364 A1 | 9/2007 | Whitacre et al. | |
| 2008/0171268 A1 * | 7/2008 | Yazami | 429/341 |

OTHER PUBLICATIONS

International Search Report and Written Opinion in connection with PCT/US2012/054952 dated Jan. 31, 2013.

* cited by examiner

*Primary Examiner* — Ula C Ruddock
*Assistant Examiner* — Matthew Van Oudenaren
(74) *Attorney, Agent, or Firm* — Corridor Law Group, P.C.

(57) ABSTRACT

An electrolyte solution comprising an additive wherein the additive is not substantially consumed during charge and discharge cycles of the electrochemical cell. Additives include Lewis acids, electron-rich transition metal complexes, and electron deficient pi-conjugated systems.

10 Claims, 8 Drawing Sheets

ELECTROLYTE MATERIALS FOR BATTERIES AND METHODS FOR USE

This application claims priority to and the benefit of U.S. Provisional Application No. 61/533,906 filed Sep. 13, 2011 entitled "Carbon-Fluoride Battery," which application is incorporated herein by reference in its entirety.

BACKGROUND OF THE INVENTION

The present invention is in the field of battery technology, and more particularly in the area of using additives to enhance electrolyte and electrode performance in metal-fluoride and carbon-fluoride batteries.

One type of battery consists of a negative electrode made primarily from lithium and a positive electrode made primarily from a compound containing carbon and fluorine. These batteries can be referred to as lithium/carbon-fluoride batteries or Li—CF batteries.

Lithium/carbon-fluoride batteries are used extensively in medical application, as back-up power electronics, military applications, and in other settings. Lithium/carbon-fluoride batteries have the highest specific energy of any batteries currently commercially available.

During discharge, lithium ions and electrons are generated from oxidation of the negative electrode while fluoride ions and carbon or produced from reduction of the positive electrode. The generated fluoride ions react with lithium ions near the positive electrode to produce a compound containing lithium and fluorine, which may deposit at the positive electrode surface.

Lithium/carbon-fluoride batteries enjoyed widespread use in commercial applications in part due to certain desirable characteristics. The carbon-fluoride positive electrode is lightweight, which makes the battery desirable in portable or mobile applications where weight is an important design consideration. Also, the carbon-fluoride positive electrode has a high capacity. Further, the overall reaction has a high electrochemical potential.

Despite their widespread use, lithium/carbon-fluoride batteries suffer from certain challenges.

The carbon-fluoride compound and the lithium-fluoride compound have comparatively low electrical conductivity as compared to certain other battery materials. Such comparatively low electrical conductivity can have the following results in electrochemical cell: comparatively low power; comparatively low operating voltage; comparatively large underpotential upon discharge; and the comparatively low capacity during a high rate of discharge.

The carbon-fluoride compound and the lithium-fluoride compound have comparatively low thermal conductivity as compared to certain other battery materials and such comparatively low thermal conductivity can result in comparatively significant heat generation by the electrochemical cell upon discharge.

Breaking the carbon-fluoride bonds of the carbon-fluoride compound requires a comparatively high activation energy as compared to certain other battery materials. Such comparatively high activation energy for bond breaking can have the following results and electrochemical cell: comparatively low power; comparatively low operating voltage; comparatively large under potential upon discharge; comparatively low capacity during a high rate of discharge; and comparatively significant heat generation upon discharge.

Metal-fluoride batteries have many of the same problems. Additionally, rechargeable metal-fluoride batteries have a large overpotential during charging, resulting in a poor energy efficiency.

There have been prior attempts to address such challenges. One prior attempt involves forming a composite positive electrode. The raw composite material contains a carbon-fluoride compound and a second compound, which is comparatively more electrically conductive than the carbon-fluoride compound. These two compounds are mixed together to form a composite material that is then formed into a positive electrode.

One example of such composite material is a carbon-fluoride compound composited with silver vanadium oxide (silver vanadium oxide is often abbreviated as "SVO" in the battery industry rather than by its periodic table symbols). This CFx/SVO composite material has been used to form a positive electrode and a battery for use in medical devices and has demonstrated increased pulse power and increased energy density when compared to a battery using a positive electrode formed only from carbon-fluoride.

CFx/SVO composite or hybrid cathode materials can exhibit high energy and high pulse power. However, in batteries using CFx/SVO hybrid cathode materials, power can degrade below critical limits for particular devices at a late depth of discharge.

Another example of a composite material for use in forming a positive electrode is a carbon-fluoride compound composited with manganese dioxide ($MnO_2$). This $CF/MnO_2$ composite material has been used to form a positive electrode where cost is a key design factor and has demonstrated increased power at high discharge rates, increased energy density, and reduced heat buildup in the electrochemical cell when compared to a battery using a positive electrode formed only from carbon-fluoride.

Although prior batteries using positive electrodes formed from these and certain other composite materials generally have higher power, higher operating potential, lower under potential, and less heat build up when compared to batteries using a positive electrode formed only from metal-fluoride or carbon-fluoride, the performance of electrochemical cell could be improved significantly. Also, certain of these performance improvements come at the expense of reduced energy density.

Certain embodiments of the present invention address the challenges found in batteries. Certain embodiments of the present invention can be used to form electrochemical cells for batteries that exhibit lower under potential, higher power, higher capacity at a high discharge rate, less heat generation, or faster heat dissipation when compared to prior batteries.

These and other challenges can be addressed by embodiments of the present invention described below.

BRIEF SUMMARY OF THE INVENTION

Certain embodiments of the invention include an electrochemical cell having a positive electrode, a negative electrode, and an electrolyte solution. In certain embodiments the positive electrode is formed from a first fluoride compound and produces a second fluoride compound upon discharge. In certain embodiments the electrolyte solution includes an additive in which the additive includes a ligand and a central atom. Certain embodiments of the invention include all of these features.

In certain embodiments, the additive is not substantially consumed during charge and discharge cycles of the electrochemical cell. In certain embodiments, the additive comprises an electron-rich transition metal complex.

In certain embodiments of the invention, the additive is mixed with an electrolyte solution. In certain embodiments of the invention, the additive is at least partially dissolved in the electrolyte solution. In certain embodiments of the invention the additive is mixed with the electrolyte solution at a non-stoichiometric ratio of additive to the first fluoride compound.

In certain embodiments of the invention, the additive at least partially solubilizes the second fluoride compound in the electrolyte solution. In certain embodiments of the invention, the additive catalyzes the breakage of chemical bonds in the first fluoride compound. In certain embodiments of the invention, the additive reversibly coordinates fluoride ions. In certain embodiments of the invention, the additive reduces the formation of aggregates of the second fluoride compound. Certain embodiments of the invention include all of these features.

In certain embodiments of the invention, the additive includes a Lewis acid. In certain embodiments of the invention, the additive includes an alkali central atom, an alkaline earth central atom, a transition metal central atom, a rare earth central atom, a late transition metal central atom, a metalloid central atom, or combinations of such central atoms. In certain embodiments of the invention, the ligand is electron withdrawing. In certain embodiments of the invention, the ligand is electron donating.

Certain embodiments include the method of making an electrolyte solution containing novel additives, the method of making an electrochemical cell containing electrolyte solutions with novel additives, and methods of use of such electrochemical cells.

DETAILED DESCRIPTION OF THE INVENTION

Figure 1A:
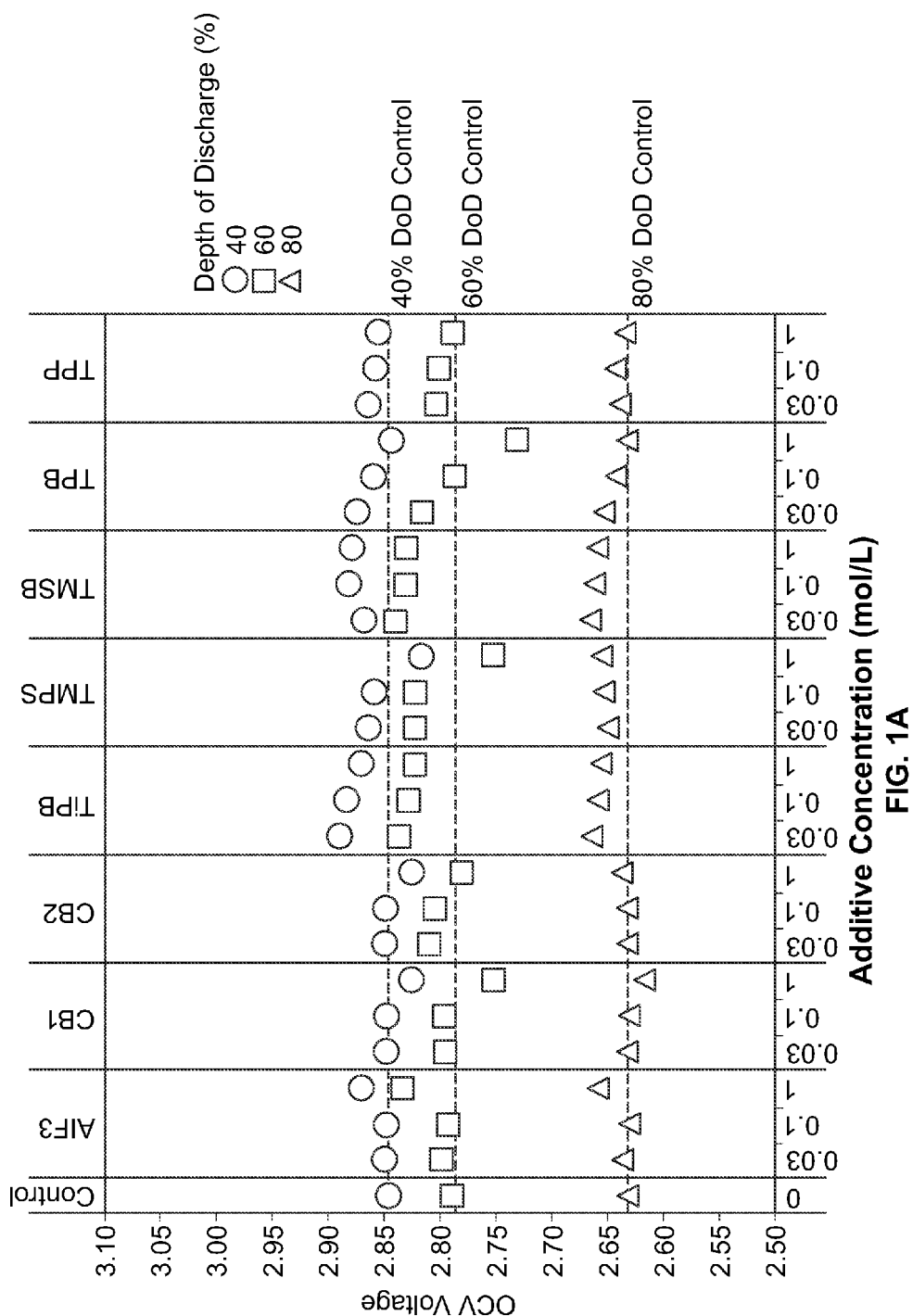
FIGS. 1A and 1B depict the results of testing of an electrolyte solution containing various additives according to certain embodiments of the invention in an electrochemical cell as compared to control. Certain additives demonstrate improved voltage performance.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The term "atom" refers to atoms in charged states as well as in a neutral state.

The term "compound" refers to atomic and molecular species that are chemically bound as well as materials that are physically mixed or bound, and such differences in meaning can be determined by the context of the usage.

The term "ion" refers to charged atomic and molecular species.

The term "chemical bond" includes covalent, Ionic, and other coordinating bonds between or among atomic or molecular species.

The term "alkali" refers to any of the chemical element in group 1 of the periodic table, including lithium (Li), sodium (Na), potassium (K), rubidium (Rb), cesium (Cs), and francium (Fr).

The term "alkaline earth" refers to any of the chemical elements in group 2 of the periodic table, including beryllium (Be), magnesium (Mg), calcium (Ca), strontium (Sr), barium (Ba), and radium (Ra).

The term "rare earth" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The term "metalloid" refers to a chemical element with properties that are in-between or a mixture of those of metals and nonmetals, including boron (B), silicon (Si), germanium (Ge), arsenic (As), antimony (Sb), tellurium (Te), carbon (C), aluminum (Al), selenium (Se), polonium (Po), and astatine (At).

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at room temperature (25° C.), unless the context clearly dictates otherwise.

Ranges presented herein are inclusive of their endpoints. Thus, for example, the range 1 to 3 includes the values 1 and 3 as well as the intermediate values.

In certain embodiments, the electrolyte solution of electrochemical cell includes an additive. These additives are useful in electrochemical cells containing a metal-fluoride electrode. These additives are useful electrochemical cells containing a carbon-fluoride electrode. These additives are useful in electrochemical cells containing an electrode formed from a compound including a transition metal and fluorine. Such a transition metal in fluorine compounds include, but are not limited to, iron-fluoride compounds (such as $FeF_3$), manganese-fluoride compounds (such as $MnF_3$), nickel-fluoride (such as $NiF_2$), and copper-fluoride compounds (such as $CuF_2$).

According to certain embodiments of the invention, one useful characteristic of the additives is that they reversibly coordinate fluoride ions. Lewis acids are one type of compound that coordinates fluoride ions. In certain embodiments of the invention, the additive includes a Lewis acid compound that coordinates fluoride ions, and in particular the additive includes a Lewis acid compound that reversibly coordinates fluoride ions. Certain additives include compounds formed from at least one ligand and at least one central atom. These ligand/central atom compounds can be Lewis acids.

According to certain embodiments of the invention, appropriate ligands include compounds capable of forming a Lewis acid when bound to central atoms. Appropriate ligands can interact with the central atom in a variety of ways. For example, in certain embodiments ligands are electron withdrawing while in other embodiments ligands are electron donating. In certain embodiments, ligands exhibit steric effects in interacting with the central atom. The specific characteristics of the ligand affect how strongly or reversibly the additive coordinates fluoride ions and can limit any side reactions that would cause the additive to decompose.

According to certain embodiments of the invention, appropriate central atoms include atoms capable of forming a Lewis acid with a ligand. According to certain aspects of the invention, appropriate central atoms are electron deficient and capable of coordinating fluoride ions. Central atoms can be alkali atoms, alkaline earth atoms, transition metal atoms, rare earth atoms, metalloids, or combinations of such atom types. According to certain embodiments of the invention, late transition metal atoms are useful as central atoms. According to certain embodiments of the invention, atoms such as boron, aluminum (including 3-coordinate aluminum), and antimony are useful as central atoms.

According to certain embodiments of the invention, another useful characteristic of the additives is that they catalyze the electrochemical breakage of carbon-fluorine bonds. Electron-rich transition metal catalysts are one class of additive that can catalyze the electrochemical breakage of carbon-fluorine bonds. Such electron-rich transition metal catalysts have been used to fluorinate and/or defluorinate organic molecules.

Without being bound by a particular principal, hypothesis, or method of action not present in the claims, in addition to being an effective catalyst for breaking of carbon-fluorine bonds, materials according to certain embodiments also: do not react with lithium metal or carbon fluoride when in the battery is in a resting state; react rapidly with lithium cations when in the oxidized state (preferably, the reaction occurs more rapidly than diffusion to, and reaction with, the lithium anode); and/or react with carbon fluoride via electrochemical reaction to reduce carbon fluoride or electron transfer from the carbon fluoride electrode (or current collector) followed by chemical reaction with carbon fluoride.

According to certain embodiments, some transition metal catalysts exhibit some of all of the characteristics describe above. For example, certain electron-rich transition metal complexes catalyze carbon-fluorine bond activation. According to certain embodiments, electron-rich complexes including transition metals can exhibit the characteristics described above. According to certain embodiments, materials with electron deficient pi-conjugated systems can exhibit the characteristics described above. Examples of electron deficient pi-conjugated systems include, but are not limited to, benzene, 1,3,5-trifluorobenzene, 1,3-dinitrobenzene, and 2,3,5,6-tetrafluoro-7,7,8,8-tetracyanoquinodimethane.

As is demonstrated in the example and results disclosed herein, batteries fabricated from such additives that catalyze the electrochemical breakage of carbon-fluorine bonds show significantly higher power (particularly at late depth of discharge) compared control batteries. Further, such additives that catalyze the electrochemical breakage of carbon-fluorine bonds provide improved power for the hybrid cathode system as well as increased voltage for the pure CFx electrode.

According to certain embodiments of the invention, the additive is mixed with a lithium salt that is useful in an electrolyte solution for an electrochemical cell having a positive electrode formed from a metal-fluoride compound or a carbon-fluoride compound. For example, lithium salts useful in such an electrolyte solution include $LiAsF_6$, $LiPF_6$, $LiBF_6$, $LiClO_4$, and combinations thereof.

Without being bound by a particular principal, hypothesis, or method of action not present in the claims, certain embodiments of the invention include additives that: reversibly coordinate fluoride ions to catalyze the electrochemical breaking of metal-fluoride for carbon-fluoride chemical bonds; of lithium-fluoride compounds; reversibly coordinate fluoride ions to increase the mobility of lithium-fluoride compounds; reduce the formation of large aggregates on or within the pores of the positive electrode; and/or aid the solvation and distribution of insulating LiF product.

According to certain embodiments of the invention, the additive is present in the electrochemical cell at concentrations typically associated with catalysts. According to certain embodiments of the invention, the additive is not completely consumed or reacted in the electrochemical reaction in the cell. Preferably, the additive included in the electrolyte catalyzes carbon-fluorine bond breakage and/or solubilizes LiF. Generally, the additive can be anything that coordinates negative fluorine ion, although it is understood that preferable and exemplary additives are described herein.

In certain embodiments of the invention, the additive is present to the amount that is significantly lower than the amount of fluoride compound present in the positive electrode of the electrochemical cell. In certain embodiments of the invention, the additive is present at a molar amount that is at least about 10 times lower than the molar amount of fluoride present in the positive electrode of the electrochemical cell. In certain embodiments of the invention, the additive is present at a molar amount that is at least about 100 times lower than the molar amount of fluoride compound present in the positive electrode of the electrochemical cell. In certain embodiments of the invention, the additive is present at a molar amount that is at least about 1000 times lower than the molar amount of fluoride compound present in the positive electrode of the electrochemical cell.

In certain embodiments of the invention, the additive is present at an amount that is significantly lower than the amount of electrolyte salt present in the electrolyte solution of the electrochemical cell. In certain embodiments of the invention, the concentration of additive in the electronic solution is less than to equal to about 0.1 M, 0.09 M, 0.08 M, 0.07 M, 0.06 M, 0.05 M, 0.04 M, 0.03 M, 0.02 M, or 0.01 M. In certain embodiments of the invention, the concentration of additive in the electrolyte solution is in the range of about 0.1 M to about 0.03 M. In certain embodiments of the invention, the concentration of additive in the electrolyte solution is about 0.03 M. In certain embodiments of the invention, the concentration of additive in the electrolyte solution is in the range of about 0.03 M to about 0.01 M. In certain embodiments of the invention, the concentration of additive in the electrolyte solution is in the range of about 0.01 M to about 0.001 M. In certain embodiments of the invention, the concentration of additive in the electronic solution is less than to equal to about 0.01 M, 0.009 M, 0.008 M, 0.007 M, 0.006 M, 0.005 M, 0.004 M, 0.003 M, 0.002 M, or 0.001 M.

Development of the additives of certain embodiments of the invention required a distinct approach from the design of previously known electrochemical cells. Certain additives in the novel electrochemical cells described herein reversibly coordinate fluoride ions. In selecting and developing candidate materials for use as additives, certain features and properties were identified. For example, candidate materials were selected in order to modulate the comparative strength of the interaction between the additive and fluoride ions. Different candidate ligand materials were selected to be paired with different candidate central atom materials. These ligand-central atom pairs were selected to form Lewis acid compounds of varying strengths of a reversible interaction with fluoride ions.

Lewis acid additives of certain embodiments of the invention preferably are stable under dry room conditions, reversibly coordinate fluoride, are catalytic, and do not include acidic protons.

In the design of previously known electrochemical cells, fluoride-containing additives have been used differently than has used herein in certain embodiments of the invention. In such previous electrochemical cells, the fluorine containing additives were used to react with lithium-fluoride compounds to enable the use of lithium-fluoride compounds in an electrolyte salt. In such a reaction, the fluorine-containing additive was used stoichiometrically. That is, the fluorine-containing additive was reacted in equal amounts with the lithium-fluoride compound. In such previous reactions, the fluorine coordinating additives irreversibly complex the fluoride ions in the first lithium-fluoride in order to form a second lithium-fluoride compound. Thus, the goal of the previously known use of fluorine containing additives and electrochemical cells was to form a soluble electrolyte salt by completely consuming the fluorine-coordinating additives in a stoichiometric reactions with lithium-fluoride.

According to certain embodiments of the invention, additives include tri-1-propylborate; triphenylboron; tris(trimethylsiloxy)boron; ethyl-2-(4,4,5,5-tetramethyl-1,3,2-dioxaborolan-2-yl)benzoate; 3-(4,4,5,5-tetramethyl-1,3,2-dioxaborolan-2-yl)furan; triphenylphosphine; aluminum fluoride; trimethyl(phenyl)silane; boron fluoride; ethyl ether complex (47-48% boron fluoride); tris(pentafluorophenyl)boron; aluminum chloride; aluminum triflate; antimony(V) fluoride; zinc chloride; zinc fluoride; lanthanum(III) chloride; lanthanum(III) fluoride; 1,1,1-trifluoroacetone; 1,3-bis [4-(dimethylamino)phenyl]-2,4-dihydroxycyclobutenediylium dihydroxide; 2,3,5,6-tetrafluoro-7,7,8,8-tetracyanoquinodimethane; acetone; calcium trifluoromethanesulfonate; dimethylphosphinic chloride; hexafluorobenzene; lanthanum(III) trifluoromethanesulfonate; magnesium trifluoromethanesulfonate; potassium trifluoromethanesulfonate; sodium trifluoromethanesulfonate; tetramethylammonium tetrafluoroborate; tri-tert-butyl borate; triethylborate; yttrium(III) trifluoromethanesulfonate; and combinations thereof.

There are several contrasts between the previously known uses of fluorine coordinating additives and the additives of certain embodiments of the invention. For example, the additives of certain embodiments of the invention: are present in the electrochemical cell in non-stoichiometric amounts; are present in amounts typically associated with catalytic activity; or not consumed in a reaction to produce an electrolyte salt; are not used as a reagent in a salt-forming reaction; reversibly complex fluoride ions; catalyze the breakage of chemical bonds in the carbon-fluoride or the metal-fluoride compound present in the electrochemical cell; at least partially dissolve a lithium-fluoride compound present in the electrochemical cell; increase the mobility of a lithium-fluoride compound present in the electrochemical cell; reduce the formation of large aggregates. It is understood that not all additives of every embodiment of the invention exhibit all of the above properties.

Development of the additives of other embodiments of the invention also required a distinct approach from the use of compounds previously known to catalyze carbon-fluorine bond breakage. In selecting and developing candidate materials for use as additives, certain features and properties were identified. For example, electron-rich transition metal complexes either have an open coordination site or the potential to give up a ligand under the desired reaction conditions. In another example, the electron-rich transition metal complexes include bulky ligands, which may reduce the rate of side reactions during the desired reaction.

Electron-rich transition metal complexes preferably have one of the following metal centers: scandium, titanium, vanadium, chromium, manganese, iron, cobalt, nickel, copper, yttrium, zirconium, molybdenum, ruthenium, rhodium, palladium, hafnium, rhenium, iridium, and gold. Electron-rich transition metal complexes preferably have one or more of the following chemical properties, structures, or moieties: low valency, high valency, a chelating ligand, a salt, a halogen, aromaticity, contain cyclopentadiene, contain a carbene, contain a phosphine, contain a carbonyl, and/or is sterically congested.

According to certain embodiments of the invention, additives include pentamethylcyclopentadienylchromium dicarbonyl dimer; (1,10-phenanthroline)bis(triphenylphosphine) copper(I) nitrate dichloromethane adduct; (1R,2R)-(−)-1,2-cyclohexanediamino-N,N'-bis(3,5-di-t-butylsalicylidene) cobalt(II); (trimethyl)pentamethylcyclopentadienyltitanium (IV); [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium (II) chloride; 1,1'-bis(di-1-propylphosphino)ferrocene; 1,1'-bis(di-t-butylphosphino)ferrocene; 1,1'-bis(dicyclohexylphosphino)ferrocene; 1,1'-bis(diphenylphosphino)ferrocene; 1,2-bis((2R,5R)-2,5-diethylphospholano)ethane(cyclooctadiene)rhodium(I) tetrafluoroborate; 3-di-1-propylphosphino-2-(N,N-dimethylamino)-1H-indene(1,5-cyclooctadiene)iridium(I) hexafluorophosphate; benzene chromium tricarbonyl; bis(2,4-dimethylpentadienyl)ruthenium(II); bis(cyclopentadienyl) iron; bis(cyclopentadienyl)manganese; bis(cyclopentadienyl)zirconium dichloride; bis(pentamethylcyclopentadienyl)cobalticinium hexafluorophosphate; bis[1,2-bis(diphenylphosphino)ethane]palladium (0); chloro(pentamethylcyclopentadienyl)[(2-pyridinyl-kN)phenyl-kC]iridium(III); chloro[1,3-bis(2,6-di-1-propylphenyl)imidazol-2-ylidene]copper(I); chlorotris(triphenylphosphine)cobalt(I); chromium(III) hexafluoroacetylacetonate; copper(I) acetate; cyclopentadienyl(triethylphosphine)copper(I); cyclopentadienyliron dicarbonyl dimer; cyclopentadienylmanganese tricarbonyl; cyclopentadienylvanadium tetracarbonyl; dichloro(benzene) ruthenium(II) dimer; dichloro[1,1'-bis(diphenylphosphino) ferrocene]cobalt(II); dichloro[1,1'-bis(diphenylphosphino) ferrocene]nickel(II); iron(II) phthalocyanine; manganese(II) phthalocyanine; manganese(III) meso-tetraphenylporphine acetate; nickel(II) phthalocyanine; pentamethylcyclopentadienylmolybdenum dicarbonyl dimer; pentamethylcyclopentadienylrhenium tricarbonyl; pentamethylcyclopentadienyltitanium trimethoxide; tris(2,2,6,6-tetramethyl-3,5-heptanedionato)chromium(III); tris(2,2,6,6-tetramethyl-3,5-heptanedionato)scandium(III); tris(2,2,6,6-tetramethyl-3,5-heptanedionato)titanium(III); tris(cyclopentadienyl)yttrium; and combinations thereof.

In known uses of electron-rich transition metal catalysts to fluorinate and/or defluorinate organic molecules, the reactions occurred in the liquid phase and in the absence of strong reducing agents. In contrast, the materials and conditions in the electrochemical cells described herein are different from the conditions of such known uses. The use of the additives according to certain embodiments in batteries adds constraints beyond those required for a fluorination and/or defluorination reaction of organic molecules.

As illustrated in certain examples herein, the additives of certain embodiments of the invention address some of the challenges of batteries by enabling higher power, increasing operating voltage, increasing capacity at a high discharge rate, producing heat generation, and increasing heat dissipation. For example, in high-drain applications certain embodiments improve the energy capacity of batteries such that a higher voltage may be achieved at a high current when compared to prior batteries. Searching embodiments extend the useful life of batteries under moderate to high drain conditions. Unexpectedly, the additives of certain embodiments of the present invention address these challenges at low concentrations.

Electrolyte solutions including additives of certain embodiments of the invention were included in electrochemical cells according to certain examples set forth below. In some situations, the CFx material in the cathode was coated using materials and method disclosed in copending U.S. patent application Ser. No. 13/612,800, which application is incorporated by reference herein in it entirety. The combination of the electrolyte solutions including additives of certain embodiments of the invention and such coated CFx materials demonstrated improved performance. In many cases, the performance improvements were substantially greater than the performance improvement realized by either the additive or the coating method on its own.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Fabrication of Electrochemical Cells Containing Additives

Materials and Synthetic Methods. All cells were prepared in a high purity argon filled glovebox (M-Braun, oxygen and humidity contents were less than 0.1 ppm). Unless otherwise specified, materials were obtained from commercial sources (e.g., Sigma-Aldrich, Advanced Research Chemicals Inc., Alfa Aesar) without further purification.

Electrode Formulation Summary. CFx was coated through a milling and/or annealing process. Milling vessels were loaded with CFx, carbon precursor (PVDF) (5 wt. %), and solvents. The vessels were sealed and then milled. After milling, solvents were evaporated at about 60 degrees C. and, if necessary, samples were annealed under flowing nitrogen gas. CFx/SVO hybrid electrodes were prepared with 50 wt. % SVO, 35 wt. % coated CFx, 4 wt. % carbon black, and 11 wt. % binder. For all the electrodes, the solid components were (SVO, CFx and carbon) premixed with mortar and pestle prior to preparing the formulation. All electrodes were prepared with a formulation composition of 85:11:4 Active materials:Binder:Conductive additive according to the following formulation method.

Electrode Preparation. About 200 mg PVDF (Sigma Aldrich) was dissolved in 10 mL NMP (Sigma Aldrich) overnight. In come cases, 72.7 mg of conductive additive was added to the solution and allowed to stir for several hours. About 150 mg of premixed electrode solids were added to 1 mL of this solution and stirred overnight. Films were cast by dropping about 100 µL of slurry onto current collectors and drying at about 150 degrees C. for about 1 hour. dried films were allowed to cool, and were then pressed at 1 tons/cm$^2$. Electrodes were further dried at about 150° C. under vacuum for 12 hours before being brought into a glove box for battery assembly. In some cases, a pure CFx electrode was prepared using similar methods.

Electrochemical Characterization. Cells were made using lithium as an anode, Cellguard 2320 separator, and 180 µL of 1M LiAsF$_6$ in 1:1 PC:DME as electrolyte. Electrodes and cells were electrochemically characterized at 37° C. using the following protocols:

Characterization Protocols. (1) Constant current discharge at C/100. (2) Pulsed discharge: Cells were subject to a series of constant current pulsing at about 20% depth of discharge. Each pulse measurement was conducted as follows: a series of 4 consecutive pulses of 2 mA/cm$^2$ and 30 second duration was applied with a 30 second rest separating the pulses. Battery voltage was monitored during the pulse sequence allowing internal battery resistance and pulse power to be calculated. Prior to conducting a pulse measurement, the cell was discharged at C/100 to the desired depth of discharge followed by holding at open current voltage (OCV) for 20 hours. (3) Alternate pulsed discharge: some cells were also tested following the pulsed discharge protocol except using up to 25 mA/cm$^2$ pulsing with 10 second duration and 10 second rest separating the pulses. (4) 0.01 C background discharge with high current pulsing at predefined depths of discharge for power measurements. Pulsing was carried out at 5 mA/cm$^2$ for 10 seconds followed by 10 seconds of OCV. Pulsing was done in sets of four pulses and the cell rested at OCV for about 10 hours prior to the first pulse and after the forth pulse. (5) testing on pure CFx electrodes was done by constant current discharge at 1 C and 0.1 C rate.

Electrolyte Additive Screening. Electrodes were prepared for the standard CFx/SVO hybrid electrode using unmodified CFx. All electrolyte additives were added to 1M LiAsF$_6$ in 1:1 PC:DME.

Electrolyte additives were tested in concentrations of about 0.03, about 0.1 and about 1.0 mol/L. table 1 lists the electrolyte additives used for primary screening.

Testing began with a primary screen of selected electrolyte additives.

TABLE 1

List of Electrolyte Additives and Shorthand Notation

| Electrolyte Code | Electrolyte Additive |
| --- | --- |
| TiPB | Tri-i-propylborate |
| TPB | Triphenylboron |
| TMSB | Tris(trimethylsiloxy)boron |
| CB1 | Ethyl-2-(4,4,5,5-tetramethyl-1,3,2-dioxaborolan-2-yl)benzoate |
| CB2 | 3-(4,4,5,5-Tetramethyl-1,3,2-dioxaborolan-2-yl)furan |
| TPP | Triphenylphosphine |
| AlF3 | Aluminum fluoride |
| TMPS | Trimethyl(phenyl)silane |

Second Screen. Electrolyte additives were tested using about 0.03 mol/L concentration. Table 2 lists the electrolyte additives used for secondary screening. In addition, several of the primary screen additives were tested with high current (25 mA/cm$^2$) pulsing.

TABLE 2

List of Electrolyte Additives and Short-Hand Notation

| Electrolyte Code | Electrolyte Additive |
| --- | --- |
| BF3 | Boron fluoride, ethyl ether complex (47-48% Boron fluoride) |
| TPFPB | Tris(pentafluorophenyl)boron |
| AlCl3 | Aluminum chloride |
| Al(otf)3 | Aluminum triflate |
| SbF5 | Antimony(V) fluoride |
| ZnCl2 | Zinc chloride |
| ZnF2 | Zinc fluoride |
| LaCl3 | Lanthanum(III) chloride |
| LaF3 | Lanthanum(III) fluoride |

Testing of Electrochemical Cells Containing Additives

Electrochemical cells formed according to the above example were tested using a variety of test methods. When compared to electrochemical cells without additives, certain electrochemical cells exhibited increases in performance.

Third Screen. Table 3 lists the additives tested in a third screen of additives including Lewis acids and their performance in voltage and rate capability testing as compared to a control. Cells were fabricated using a hybrid cathode (CFx/SVO) for the results reported in Table 3. Rate capability is expressed as the percentage of the discharge at C rate as compared to 0.1 C rate.

TABLE 3

Performance of Lewis Acid Type Additives

| Electrolyte Additive | Voltage at 1C (V) | Rate Capability C/0.1C (%) |
| --- | --- | --- |
| Control | 2.27 | 76.00 |
| 1,1,1-Trifluoroacetone | 2.30 | 82.73 |
| 1,3-Bis[4-(dimethylamino)phenyl]-2,4-dihydroxycyclobutenediylium dihydroxide | 2.28 | 82.86 |
| 2,3,5,6-Tetrafluoro-7,7,8,8-tetracyanoquinodimethane | 2.26 | 83.43 |
| Acetone | 2.26 | 81.82 |
| Calcium trifluoromethanesulfonate | 2.25 | 79.95 |
| Dimethylphosphinic chloride | 2.30 | 85.10 |
| Hexafluorobenzene | 2.27 | 84.03 |
| Lanthanum(III) trifluoromethanesulfonate | 2.24 | 79.62 |
| Magnesium trifluoromethanesulfonate | 2.28 | 78.36 |
| Potassium trifluoromethanesulfonate | 2.28 | 84.43 |
| Sodium trifluoromethanesulfonate | 2.27 | 80.72 |
| Tetramethylammonium tetrafluoroborate | 2.29 | 79.69 |
| Tri-tert-butyl borate | 2.31 | 79.42 |
| Triethylborate | 2.30 | 73.78 |
| Yttrium(III) trifluoromethanesulfonate | 2.26 | 81.69 |

Table 4 lists the additives tested in a third screen of additives including Lewis acids and their performance in testing as compared to a control. Cells were fabricated using a hybrid cathode (CFx/SVO) for the results reported in Table 4. Table 4 reports the power measured for the cell at 70% depth of discharge and at 80% depth of discharge.

TABLE 4

Performance of Lewis Acid Type Additives

| Electrolyte Additive | Power 70% Capacity (mW/cm$^2$) | Power 80% Capacity (mW/cm$^2$) |
| --- | --- | --- |
| Control | 12.15 | 11.70 |
| 1,1,1-Trifluoroacetone | 12.64 | 11.87 |
| 1,3-Bis[4-(dimethylamino)phenyl]-2,4-dihydroxycyclobutenediylium dihydroxide | 12.27 | 11.73 |
| 2,3,5,6-Tetrafluoro-7,7,8,8-tetracyanoquinodimethane | 10.03 | 9.79 |
| Acetone | 12.40 | 11.73 |
| Calcium trifluoromethanesulfonate | 11.75 | 11.39 |
| Dimethylphosphinic chloride | 12.23 | 11.61 |
| Hexafluorobenzene | 12.45 | 11.82 |
| Lanthanum(III) trifluoromethanesulfonate | 12.37 | 12.14 |

TABLE 4-continued

Performance of Lewis Acid Type Additives

| Electrolyte Additive | Power 70% Capacity (mW/cm$^2$) | Power 80% Capacity (mW/cm$^2$) |
|---|---|---|
| Magnesium trifluoromethanesulfonate | 12.31 | 11.74 |
| Potassium trifluoromethanesulfonate | 12.72 | 11.93 |
| Sodium trifluoromethanesulfonate | 12.23 | 11.69 |
| Tetramethylammonium tetrafluoroborate | 12.64 | 11.97 |
| Tri-tert-butyl borate | 12.05 | 11.87 |
| Triethylborate | 12.57 | 12.07 |
| Yttrium(III) trifluoromethanesulfonate | 12.44 | 12.05 |

Transition Metal Catalyst Additives: Table 5 lists the additives tested in a screen of additives including transition metal and other electron rich materials and their performance in voltage and rate capability testing as compared to a control. Cells were fabricated using a hybrid cathode (CFx/SVO) for the results reported in Table 5. Rate capability is expressed as the percentage of the discharge at C rate as compared to 0.1 C rate.

TABLE 5

Performance of Transition Metal Type Additives

| Electrolyte Additive | Voltage at 1C (V) | Rate Capability C/0.1C (%) |
|---|---|---|
| Control | 2.26 | 76.58 |
| Pentamethylcyclopentadienylchromium dicarbonyl dimer | 2.27 | 81.60 |
| (1,10-Phenanthroline)bis(triphenylphosphine)copper(I) nitrate dichloromethane adduct | 2.08 | 36.77 |
| (1R,2R)-(-)-1,2-Cyclohexanediamino-N,N'-bis(3,5-di-t-butylsalicylidene)cobalt(II) | 2.24 | 81.11 |
| (Trimethyl)pentamethylcyclopentadienyltitanium(IV) | 2.12 | 62.63 |
| [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride | 2.22 | 69.61 |
| 1,1'-Bis(di-i-propylphosphino)ferrocene | 2.26 | 78.96 |
| 1,1'-Bis(di-t-butylphosphino)ferrocene | 2.26 | 74.82 |
| 1,1'-Bis(dicyclohexylphosphino)ferrocene | 2.29 | 77.76 |
| 1,1'-Bis(diphenylphosphino)ferrocene | 2.24 | 81.43 |
| 1,2-Bis((2R,5R)-2,5-diethylphospholano)ethane(cyclooctadiene)rhodium(I) tetrafluoroborate | 2.17 | 63.42 |
| 3-Di-i-propylphosphino-2-(N,N-dimethylamino)-1H-indene(1,5-cyclooctadiene)iridium(I) hexafluorophosphate | 2.23 | 79.40 |
| Benzene chromium tricarbonyl | 2.29 | 82.25 |
| Bis(2,4-dimethylpentadienyl)ruthenium(II) | 2.29 | 75.87 |
| Bis(cyclopentadienyl)iron | 2.27 | 77.81 |
| Bis(cyclopentadienyl)manganese | 1.65 | 5.02 |
| Bis(cyclopentadienyl)zirconium dichloride | 2.09 | 44.36 |
| Bis(pentamethylcyclopentadienyl)cobalticinium hexafluorophosphate | 2.26 | 80.80 |
| Bis[1,2-bis(diphenylphosphino)ethane]palladium (0) | 2.23 | 74.79 |
| Chloro(pentamethylcyclopentadienyl)[(2-pyridinyl-kN)phenyl-kC]iridum(III) | 2.24 | 77.64 |
| Chloro[1,3-bis(2,6-di-i-propylphenyl)imidazol-2-ylidene]copper(I) | 2.30 | 83.68 |
| Chlorotris(triphenylphosphine)cobalt(I) | 2.14 | 64.99 |
| Chromium(III) hexafluoroacetylacetonate | 2.25 | 82.19 |
| Copper(I) acetate | 2.27 | 84.78 |
| Cyclopentadienyl(triethylphosphine)copper(I) | 1.71 | 36.84 |
| Cyclopentadienyliron dicarbonyl dimer | 2.27 | 84.40 |
| Cyclopentadienylmanganese tricarbonyl | 2.22 | 80.83 |
| Cyclopentadienylvanadium tetracarbonyl | 2.24 | 56.81 |
| Dichloro(benzene)ruthenium(II) dimer | 2.24 | 77.84 |
| Dichloro[1,1'-bis(diphenylphosphino)ferrocene]cobalt(II) | 2.24 | 77.82 |
| Dichloro[1,1'-bis(diphenylphosphino)ferrocene]nickel(II) | 2.23 | 72.39 |
| Iron(II) phthalocyanine | 2.33 | 54.65 |
| Manganese(II) phthalocyanine | No Data | No Data |
| Manganese(III) meso-tetraphenylporphine acetate | 2.08 | 54.35 |

TABLE 5-continued

Performance of Transition Metal Type Additives

| Electrolyte Additive | Voltage at 1C (V) | Rate Capability C/0.1C (%) |
|---|---|---|
| Nickel(II) phthalocyanine | 2.24 | 78.67 |
| Pentamethylcyclopentadienylmolybdenum dicarbonyl dimer | 2.28 | 81.42 |
| Pentamethylcyclopentadienylrhenium tricarbonyl | 2.26 | 78.18 |
| Pentamethylcyclopentadienyltitanium trimethoxide | 2.14 | 68.21 |
| Tris(2,2,6,6-tetramethyl-3,5-heptanedionato)chromium(III) | 2.28 | 76.65 |
| Tris(2,2,6,6-tetramethyl-3,5-heptanedionato)scandium(III) | 2.26 | 81.25 |
| Tris(2,2,6,6-tetramethyl-3,5-heptanedionato)titanium(III) | 2.17 | 69.79 |
| Tris(cyclopentadienyl)yttrium | No Data | No Data |
| Vanadyl meso-tetraphenylporphine | 2.27 | 76.19 |

Table 6 lists the additives tested in a screen of additives including transition metal and other electron rich materials and their performance in testing as compared to a control. Cells were fabricated using a hybrid cathode (CFx/SVO) for the results reported in Table 6. Table 6 reports the power measured for the cell at 70% depth of discharge and at 80% depth of discharge.

TABLE 6

Performance of Transition Metal Type Additives

| Electrolyte Additive | Power (70% Capacity, mW/cm$^2$) | Power (80% Capacity, mW/cm$^2$) |
|---|---|---|
| Control | 12.15 | 11.70 |
| Pentamethylcyclopentadienylchromium dicarbonyl dimer | 12.36 | 11.97 |
| (1,10-Phenanthroline)bis(triphenylphosphine)copper(I) nitrate dichloromethane adduct | 10.70 | 10.11 |
| (1R,2R)-(-)-1,2-Cyclohexanediamino-N,N'-bis(3,5-di-t-butylsalicylidene)cobalt(II) | 12.31 | 11.85 |
| (Trimethyl)pentamethylcyclopentadienyltitanium(IV) | 9.67 | 9.42 |
| [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride | 11.83 | 10.01 |
| 1,1'-Bis(di-i-propylphosphino)ferrocene | 12.04 | 11.43 |
| 1,1'-Bis(di-t-butylphosphino)ferrocene | 12.30 | 11.67 |
| 1,1'-Bis(dicyclohexylphosphino)ferrocene | 12.43 | 11.95 |
| 1,1'-Bis(diphenylphosphino)ferrocene | 11.95 | 10.72 |
| 1,2-Bis((2R,5R)-2,5-diethylphospholano)ethane(cyclooctadiene)rhodium(I) tetrafluoroborate | 11.53 | 10.82 |
| 3-Di-i-propylphosphino-2-(N,N-dimethylamino)-1H-indene(1,5-cyclooctadiene)iridium(I) hexafluorophosphate | 12.36 | 11.93 |
| Benzene chromium tricarbonyl | 12.27 | 11.81 |
| Bis(2,4-dimethylpentadienyl)ruthenium(II) | 11.97 | 11.46 |
| Bis(cyclopentadienyl)iron | 12.13 | 11.72 |
| Bis(cyclopentadienyl)manganese | 11.27 | 11.24 |
| Bis(cyclopentadienyl)zirconium dichloride | 12.04 | 11.34 |
| Bis(pentamethylcyclopentadienyl)cobalticinium hexafluorophosphate | 11.49 | 10.94 |
| Bis[1,2-bis(diphenylphosphino)ethane]palladium (0) | 12.25 | 11.34 |
| Chloro(pentamethylcyclopentadienyl)[(2-pyridinyl-kN)phenyl-kC]iridum(III) | 11.53 | 10.93 |
| Chloro[1,3-bis(2,6-di-i-propylphenyl)imidazol-2-ylidene]copper(I) | 12.25 | 11.96 |
| Chlorotris(triphenylphosphine)cobalt(I) | 10.57 | 9.00 |
| Chromium(III) hexafluoroacetylacetonate | 12.07 | 11.64 |
| Copper(I) acetate | 12.15 | 11.57 |
| Cyclopentadienyl(triethylphosphine)copper(I) | 9.00 | 7.86 |

TABLE 6-continued

Performance of Transition Metal Type Additives

| Electrolyte Additive | Power (70% Capacity, mW/cm²) | Power (80% Capacity, mW/cm²) |
|---|---|---|
| Cyclopentadienyliron dicarbonyl dimer | 12.20 | 11.48 |
| Cyclopentadienylmanganese tricarbonyl | 11.94 | 11.61 |
| Cyclopentadienylvanadium tetracarbonyl | 12.14 | 11.77 |
| Dichloro(benzene)ruthenium(II) dimer | 5.15 | 4.29 |
| Dichloro[1,1'-bis(diphenylphosphino)ferrocene]cobalt(II) | 9.91 | 7.90 |
| Dichloro[1,1'-bis(diphenylphosphino)ferrocene]nickel(II) | 10.13 | 8.33 |
| Iron(II) phthalocyanine | 11.81 | 11.43 |
| Manganese(II) phthalocyanine | 11.41 | 11.05 |
| Manganese(III) meso-tetraphenylporphine acetate | 12.05 | 9.80 |
| Nickel(II) phthalocyanine | 12.31 | 11.90 |
| Pentamethylcyclopentadienylmolybdenum dicarbonyl dimer | 12.09 | 11.68 |
| Pentamethylcyclopentadienylrhenium tricarbonyl | 11.83 | 11.49 |
| Pentamethylcyclopentadienyltitanium trimethoxide | 11.48 | 11.05 |
| Tris(2,2,6,6-tetramethyl-3,5-heptanedionato)chromium(III) | 12.26 | 11.82 |
| Tris(2,2,6,6-tetramethyl-3,5-heptanedionato)scandium(III) | 12.50 | 12.06 |
| Tris(2,2,6,6-tetramethyl-3,5-heptanedionato)titanium(III) | 12.34 | 11.95 |
| Tris(cyclopentadienyl)yttrium | 12.25 | 11.84 |
| Vanadyl meso-tetraphenylporphine | 12.18 | 11.83 |

Table 7 lists the additives tested in a screen of additives including transition metal and other electron rich materials and their performance in voltage and rate capability testing as compared to a control. Cells were fabricated using a pure CFx cathode for the results reported in Table 7. Rate capability is expressed as the percentage of the discharge at C rate as compared to 0.1 C rate.

TABLE 7

Performance of Transition Metal Type Additives

| Electrolyte Additive | Voltage at 1C (V) | Rate Capability C/0.1C (%) |
|---|---|---|
| Control | 2.16 | 60.50 |
| Pentamethylcyclopentadienylchromium dicarbonyl dimer | 2.24 | 62.89 |
| (1,10-Phenanthroline)bis(triphenylphosphine)copper(I) nitrate dichloromethane adduct | 2.12 | 56.03 |
| (1R,2R)-(-)-1,2-Cyclohexanediamino-N,N'-bis(3,5-di-t-butylsalicylidene)cobalt(II) | 2.19 | 67.02 |
| (Trimethyl)pentamethylcyclopentadienyltitanium(IV) | 2.20 | 61.36 |
| [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride | 2.14 | 55.64 |
| 1,1'-Bis(di-i-propylphosphino)ferrocene | 2.19 | 59.46 |
| 1,1'-Bis(di-t-butylphosphino)ferrocene | 2.21 | 63.38 |
| 1,1'-Bis(dicyclohexylphosphino)ferrocene | 2.18 | 55.37 |
| 1,1'-Bis(diphenylphosphino)ferrocene | 2.23 | 65.16 |
| 1,2-Bis((2R,5R)-2,5-diethylphospholano)ethane(cyclooctadiene)rhodium(I) tetrafluoroborate | 2.10 | 39.44 |
| 3-Di-i-propylphosphino-2-(N,N-dimethylamino)-1H-indene(1,5-cyclooctadiene)iridium(I) hexafluorophosphate | 2.15 | 64.95 |
| Benzene chromium tricarbonyl | 2.14 | 42.95 |
| Bis(2,4-dimethylpentadienyl)ruthenium(II) | 2.17 | 52.47 |
| Bis(cyclopentadienyl)iron | 2.21 | 64.39 |
| Bis(cyclopentadienyl)manganese | 1.22 | 4.92 |
| Bis(cyclopentadienyl)zirconium dichloride | 2.10 | 43.32 |

TABLE 7-continued

Performance of Transition Metal Type Additives

| Electrolyte Additive | Voltage at 1C (V) | Rate Capability C/0.1C (%) |
|---|---|---|
| Bis(pentamethylcyclopentadienyl)cobalticinium hexafluorophosphate | 2.17 | 63.45 |
| Bis[1,2-bis(diphenylphosphino)ethane]palladium (0) | 2.17 | 48.35 |
| Chloro(pentamethylcyclopentadienyl)[(2-pyridinyl-kN)phenyl-kC]iridum(III) | 2.12 | 56.42 |
| Chloro[1,3-bis(2,6-di-i-propylphenyl)imidazol-2-ylidene]copper(I) | 2.20 | 62.34 |
| Chlorotris(triphenylphosphine)cobalt(I) | 2.22 | 69.13 |
| Chromium(III) hexafluoroacetylacetonate | 2.19 | 64.64 |
| Copper(I) acetate | 2.23 | 64.38 |
| Cyclopentadienyl(triethylphosphine)copper(I) | 2.14 | 37.15 |
| Cyclopentadienyliron dicarbonyl dimer | 2.15 | 64.21 |
| Cyclopentadienylmanganese tricarbonyl | 2.13 | 47.52 |
| Cyclopentadienylvanadium tetracarbonyl | 2.22 | 40.91 |
| Dichloro(benzene)ruthenium(II) dimer | 2.07 | 31.84 |
| Dichloro[1,1'-bis(diphenylphosphino)ferrocene]cobalt(II) | 2.17 | 56.84 |
| Dichloro[1,1'-bis(diphenylphosphino)ferrocene]nickel(II) | 2.15 | 60.38 |
| Iron(II) phthalocyanine | 2.11 | 49.52 |
| Manganese(II) phthalocyanine | 2.14 | 61.76 |
| Manganese(III) meso-tetraphenylporphine acetate | 2.12 | 46.32 |
| Nickel(II) phthalocyanine | 2.11 | 40.15 |
| Pentamethylcyclopentadienylmolybdenum dicarbonyl dimer | 2.18 | 63.87 |
| Pentamethylcyclopentadienylrhenium tricarbonyl | 2.15 | 54.05 |
| Pentamethylcyclopentadienyltitanium trimethoxide | 2.21 | 57.04 |
| Tris(2,2,6,6-tetramethyl-3,5-heptanedionato)chromium(III) | 2.23 | 67.05 |
| Tris(2,2,6,6-tetramethyl-3,5-heptanedionato)scandium(III) | 2.21 | 62.21 |
| Tris(2,2,6,6-tetramethyl-3,5-heptanedionato)titanium(III) | 2.28 | 66.13 |
| Tris(cyclopentadienyl)yttrium | 2.19 | 58.41 |
| Vanadyl meso-tetraphenylporphine | 2.21 | 52.99 |

Figure 1B:
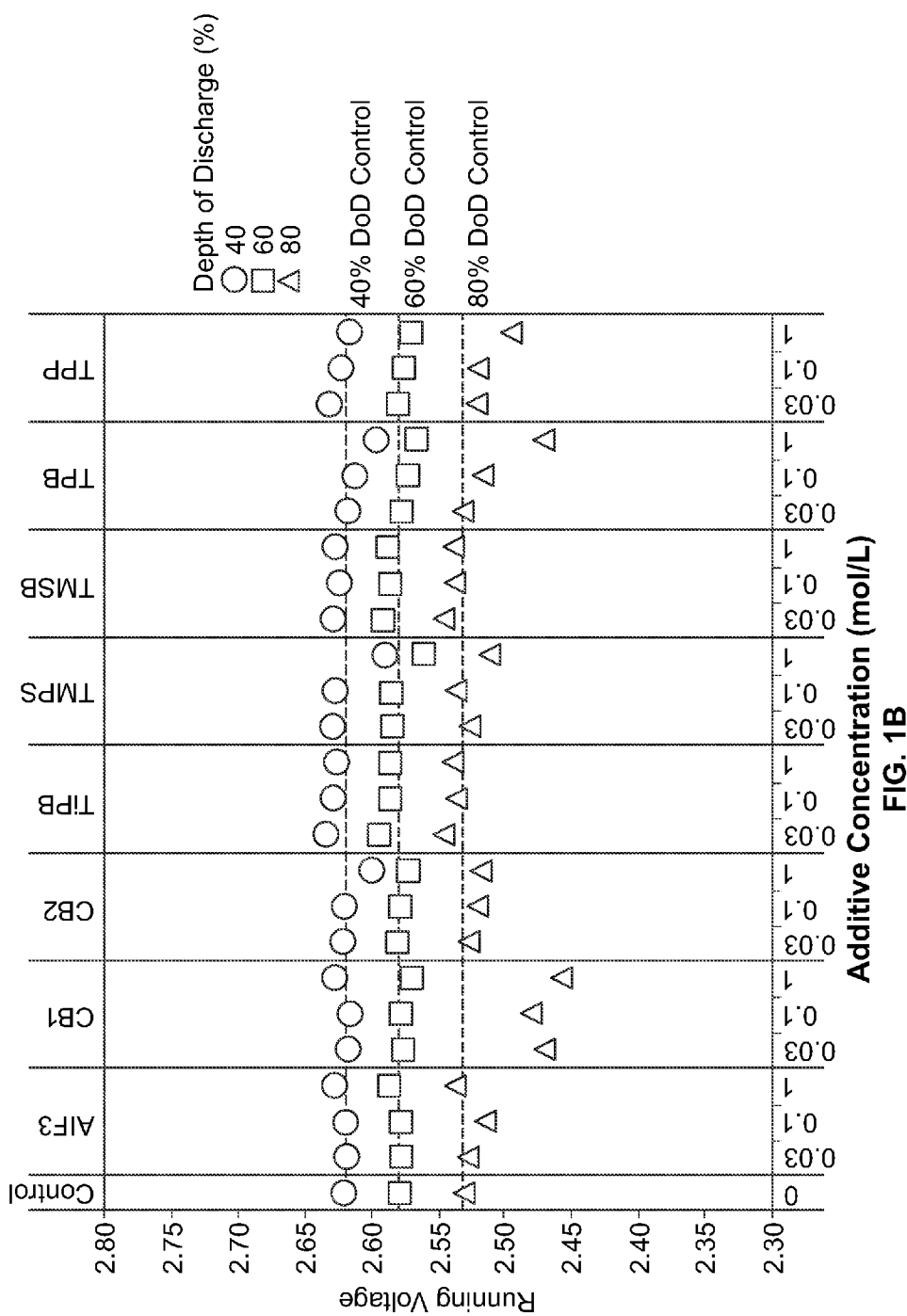
Figure 2:
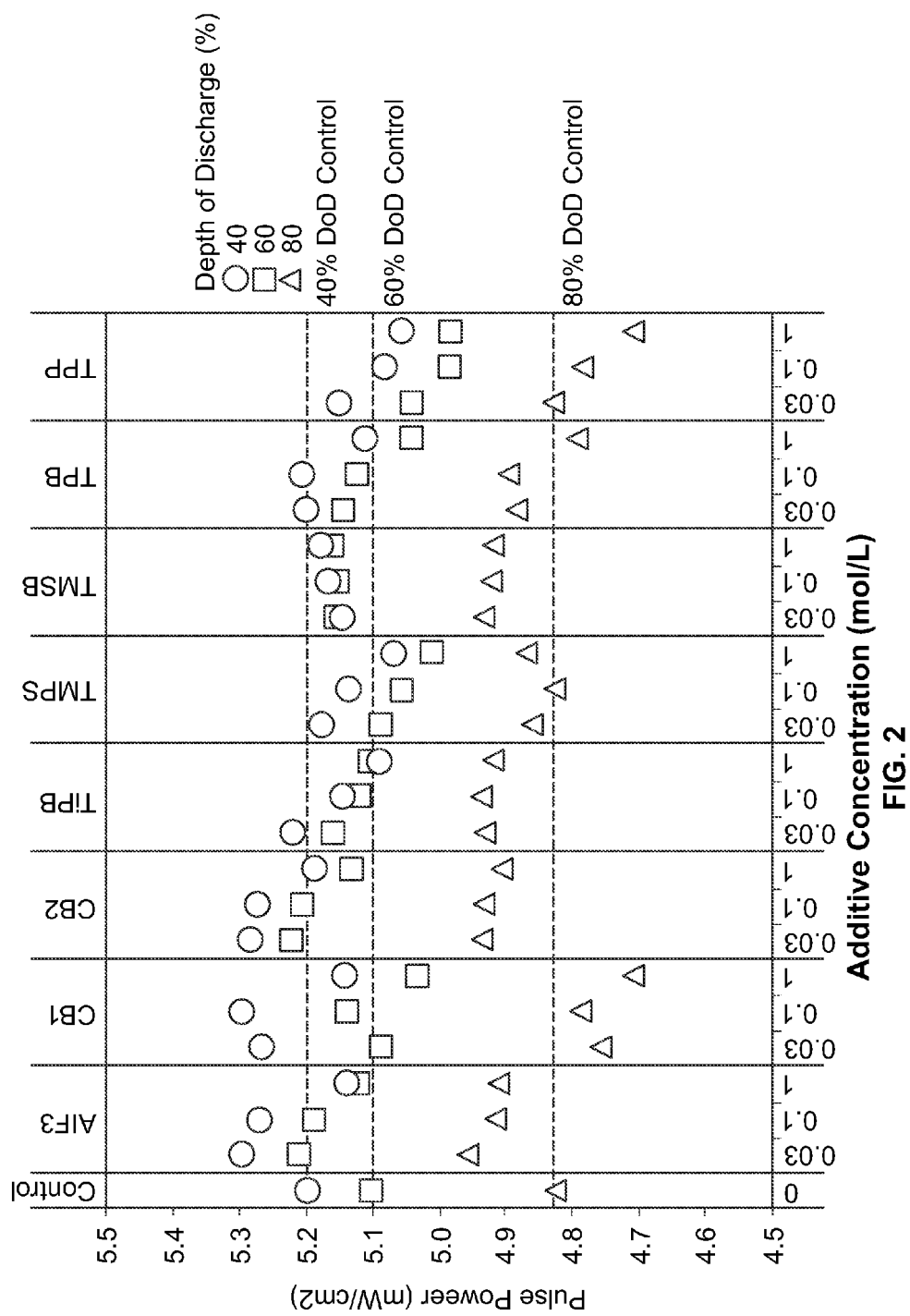
FIG. 2 depicts the results of testing of an electrolyte solution containing various additives according to certain embodiments of the invention in an electrochemical cell as compared to control. Certain additives demonstrate improved pulse power performance.
Figure 3:
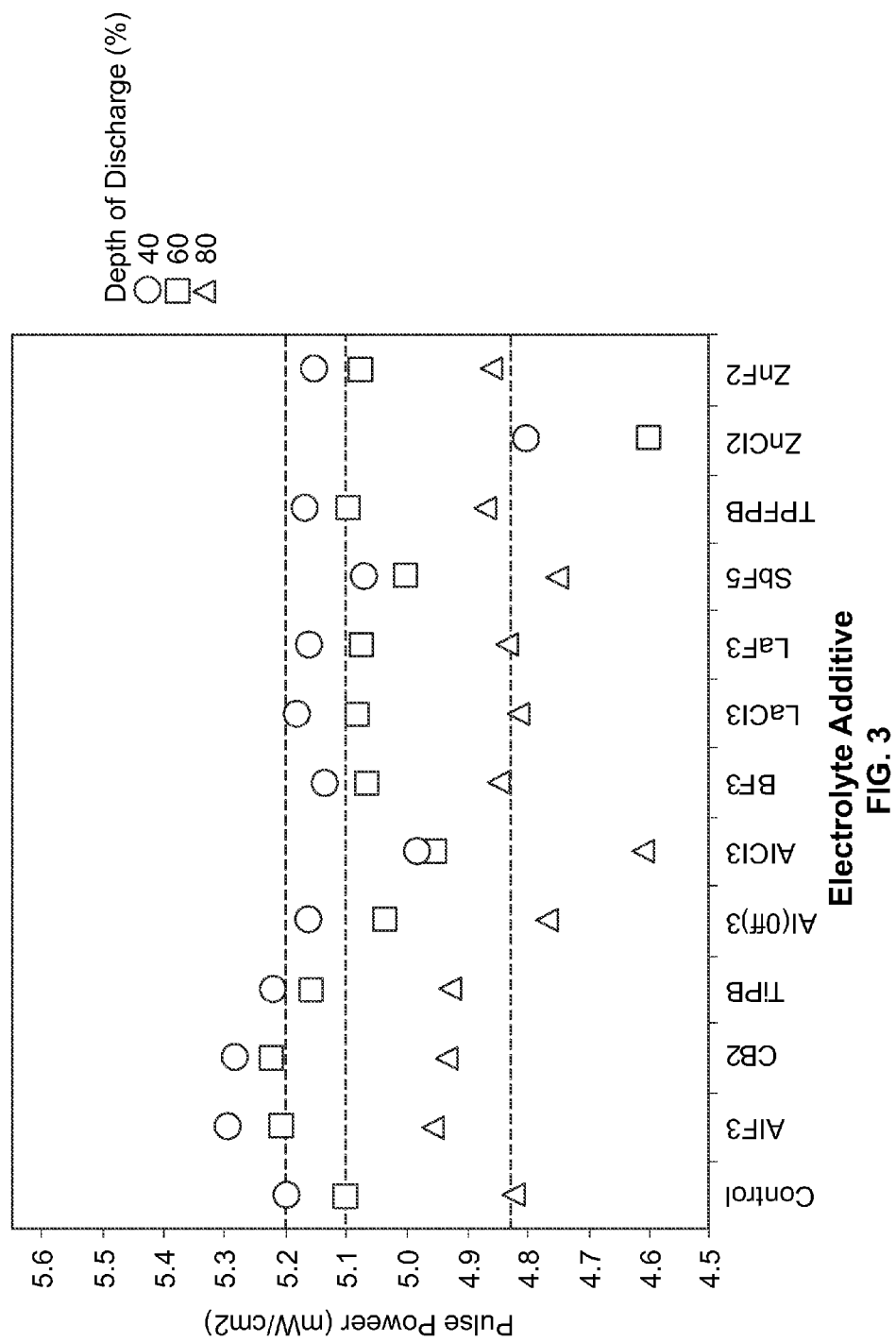
FIG. 3 depicts the results of testing of an electrolyte solution containing various additives according to certain embodiments of the invention in an electrochemical cell as compared to control. Certain additives demonstrate improved pulse power performance.
Figure 4:
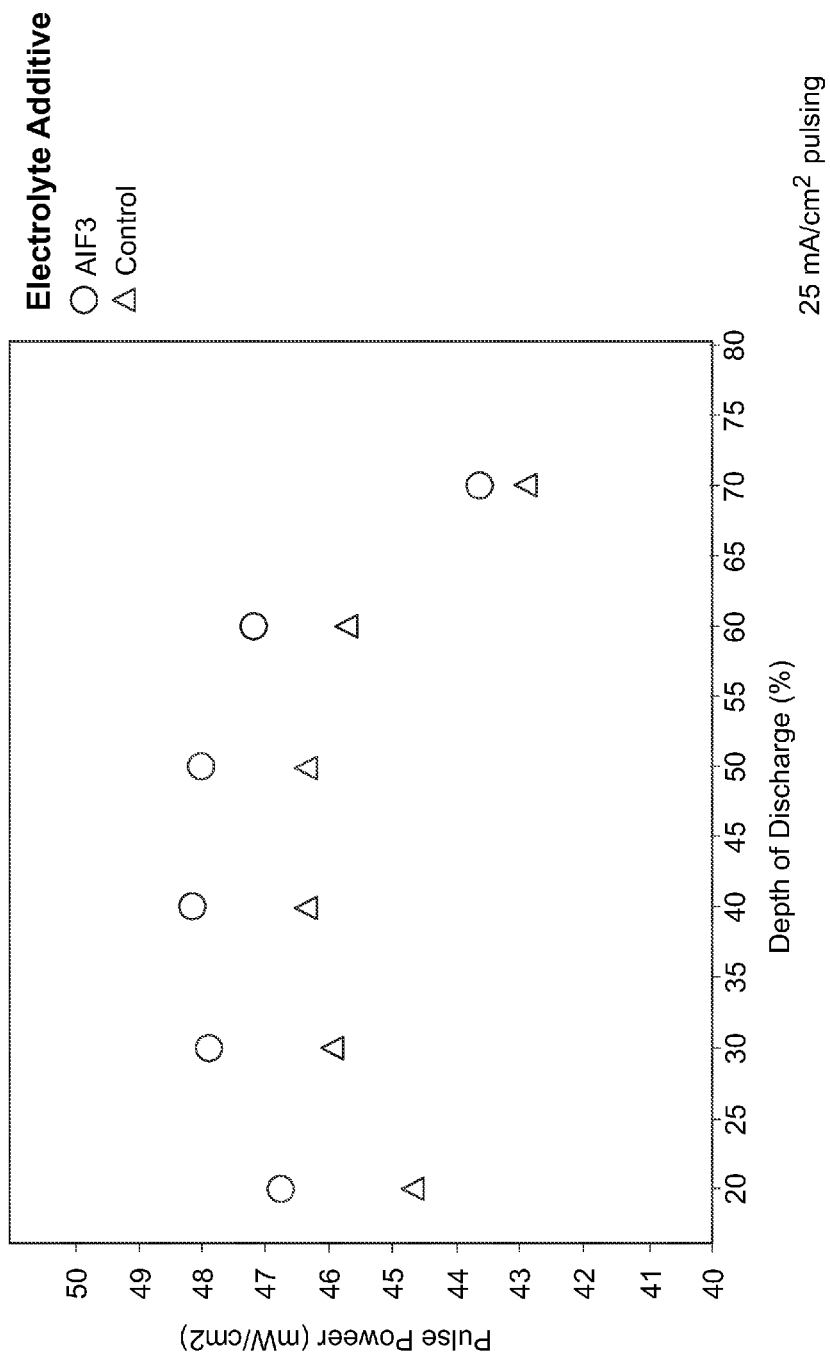
FIG. 4 depicts the results of testing of an electrolyte solution containing an additive according to certain embodiments of the invention in an electrochemical cell as compared to control. The additive demonstrates improved pulse power performance at varying depths of discharge.

Referring now to FIGS. 1A and 1B, the presence of certain additives resulted in up to about 50 mV increases in open circuit voltage in a CFx/SVO hybrid cell. As depicted in FIGS. 1A and 1B, the presence of certain additives did not cause a reduction in operating voltage from about 20% to about 80% depth of discharge (DoD) in a CFx/SVO hybrid cell. As depicted in FIGS. 2 and 3, the presence of certain additives resulted in about a 0.1 mW/cm$^2$ increase impulse power at 2 mA/cm$^2$ pulse current in a CFx/SVO hybrid cell. As depicted in FIG. 4, the presence of certain additives resulted in as much as about a 2 mW/cm$^2$ increase impulse power at 25 mA/cm$^2$ pulse current in a CFx/SVO hybrid cell.

Figure 5:
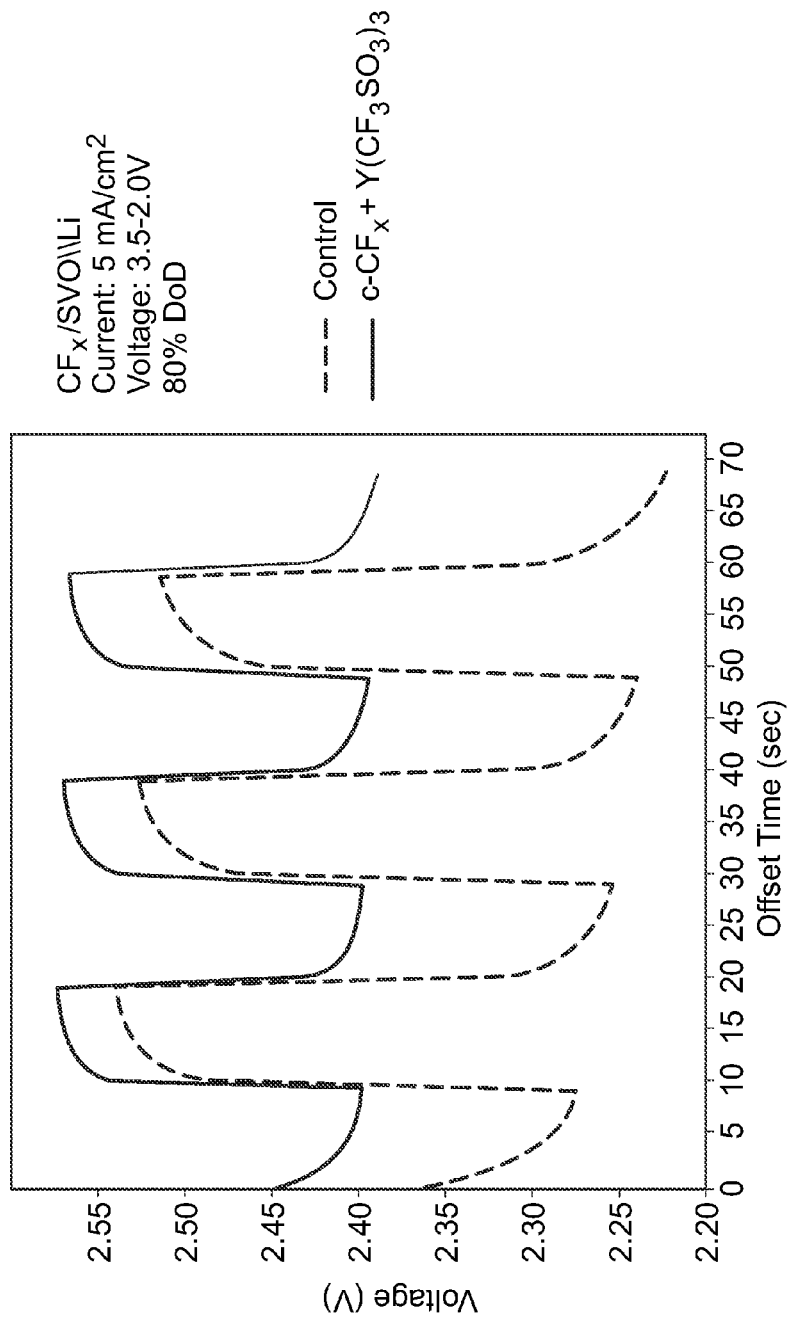
FIG. 5 depicts the results of testing of an electrolyte solution containing an additive according to certain embodiments of the invention in an electrochemical cell as compared to control. The additive demonstrates improved voltage performance.
Figure 6:
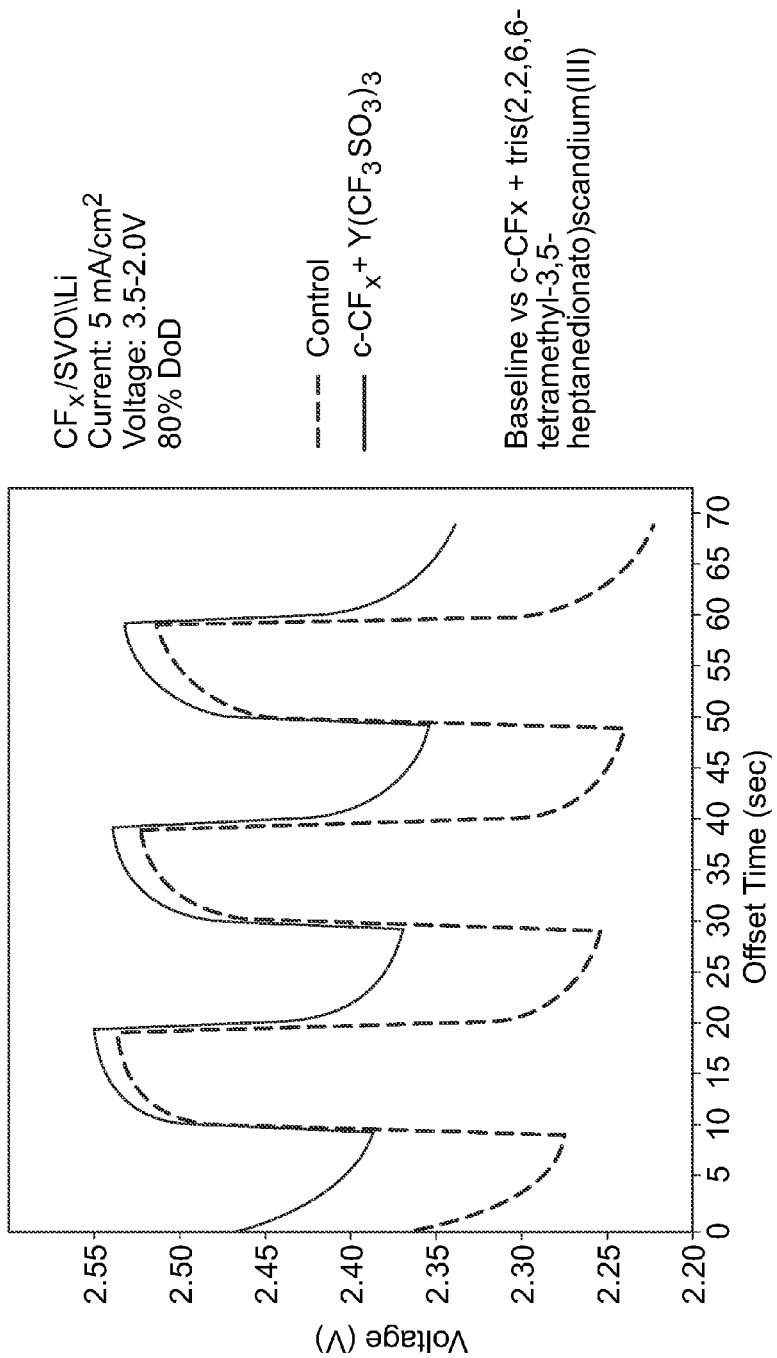
FIG. 6 depicts the results of testing of an electrolyte solution containing an additive according to certain embodiments of the invention in an electrochemical cell as compared to control. The additive demonstrates improved voltage performance.
Figure 7:
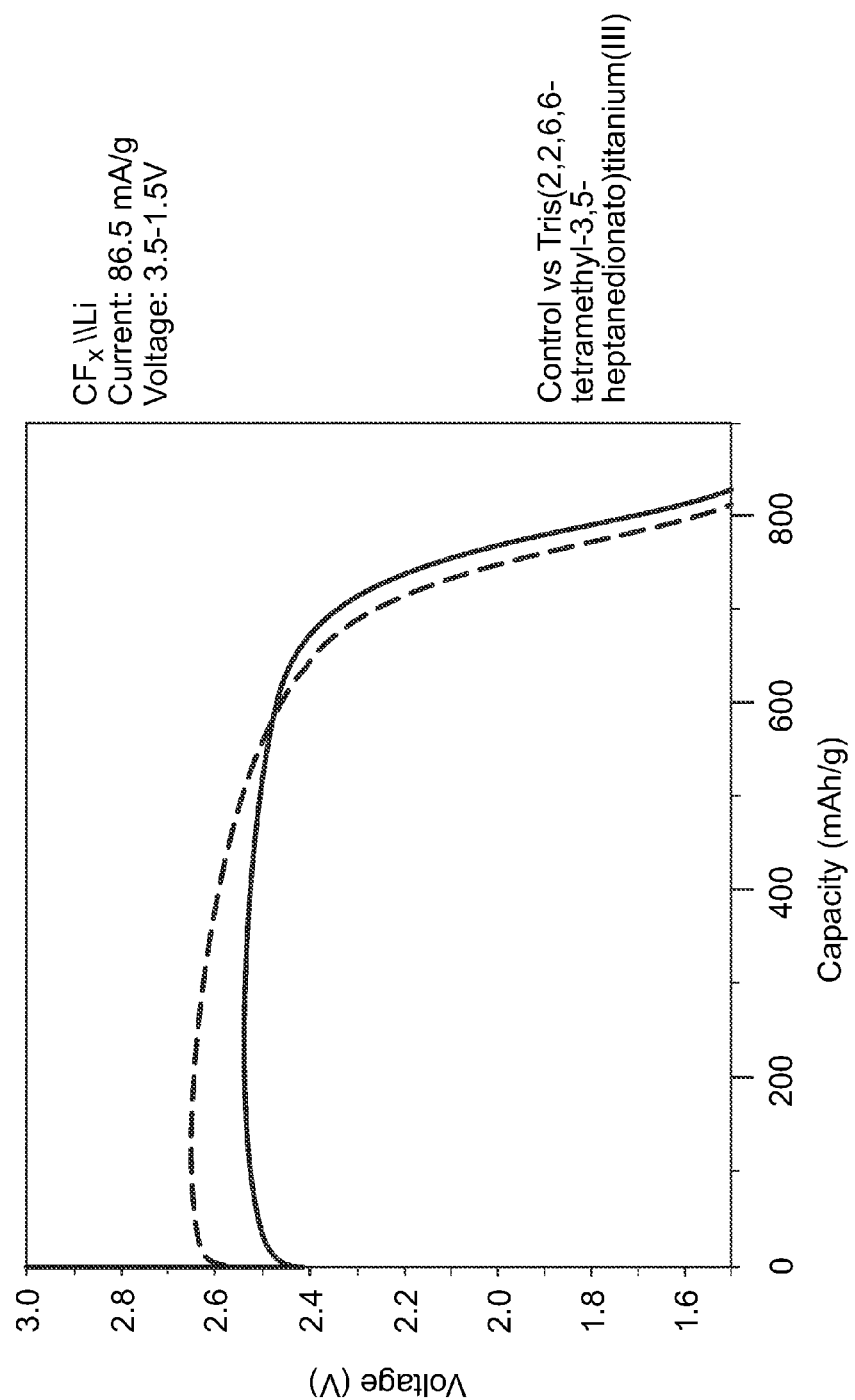
FIG. 7 depicts the results of testing of an electrolyte solution containing an additive according to certain embodiments of the invention in an electrochemical cell as compared to control. The additive demonstrates improved voltage performance as a function of capacity.

Referring now to FIG. 5, certain additives improved the pulse power at 80% depth of discharge. FIG. 6 illustrates the pulse power improvement at 80% depth of discharge. FIG. 7 shows voltage improvement from these additives for the pure CFx electrode.

Lewis acid additives according to certain embodiments improve rate capability by about 6% as compared to control electrolyte without additives. Lewis acid additives according to certain embodiments improve pulse power by about 5% as compared to control electrolyte without additives. Lewis acid additives according to certain embodiments improve useable capacity by about 14% as compared to control electrolyte without additives.

Electron rich additives according to certain embodiments improve 1 C voltage by about 5.5% as compared to control electrolyte without additives in cells with a pure CFx cathode. Electron rich additives according to certain embodiments improve rate capability by about 14% as compared to control electrolyte without additives in cells with a pure CFx cathode. Electron rich additives according to certain embodiments improve useable capacity by about 11% as compared to control electrolyte without additives in cells with a hybrid cathode.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrochemical cell, comprising:
a positive electrode comprising a first fluoride compound, the positive electrode producing a second fluoride compound upon discharge;
a negative electrode;
an electrolyte solution comprising a lithium salt and tris(2,2,6,6-tetramethyl-3,5-heptanedionato)scandium(III).

2. The electrochemical cell of claim 1 wherein the tris(2,2,6,6-tetramethyl-3,5-heptanedionato)scandium(III) is present in the electrolyte solution at concentrations of less than 0.1 mol/L.

3. The electrochemical cell of claim 1 wherein the ratio of the amount of the tris(2,2,6,6-tetramethyl-3,5-heptanedionato)scandium(III) in the electrochemical cell to the amount of first fluoride compound in the electrochemical cell is less than about 0.1.

4. An electrochemical cell, comprising:
a positive electrode comprising a first fluoride compound, the positive electrode producing a second fluoride compound upon discharge;
a negative electrode;
an electrolyte solution comprising a lithium salt and tris(2,2,6,6-tetramethyl-3,5-heptanedionato)titanium(III).

5. The electrochemical cell of claim 4 wherein the tris(2,2,6,6-tetramethyl-3,5-heptanedionato)titanium(III) is present in the electrolyte solution at concentrations of less than 0.1 mol/L.

6. The electrochemical cell of claim 4 wherein the ratio of the amount of the tris(2,2,6,6-tetramethyl-3,5-heptanedionato)titanium(III) in the electrochemical cell to the amount of first fluoride compound in the electrochemical cell is less than about 0.1.

7. A electrolyte solution, comprising:
a lithium salt, an organic solvent, and tris(2,2,6,6-tetramethyl-3,5-heptanedionato)scandium(III).

8. A The electrolyte solution of claim 7 wherein the tris(2,2,6,6-tetramethyl-3,5-heptanedionato)scandium(III) is present in the electrolyte solution at a concentration of less than 0.1 mol/L.

9. A electrolyte solution, comprising:
a lithium salt, an organic solvent, and tris(2,2,6,6-tetramethyl-3,5-heptanedionato)titanium(III).

10. The electrolyte solution of claim 9 wherein the tris(2,2,6,6-tetramethyl-3,5-heptanedionato)titanium(III) is present in the electrolyte solution at a concentration of less than 0.1 mol/L.

* * * * *